D. TERREL.
TIRE.
APPLICATION FILED AUG. 6, 1915.
1,187,677. Patented June 20, 1916.
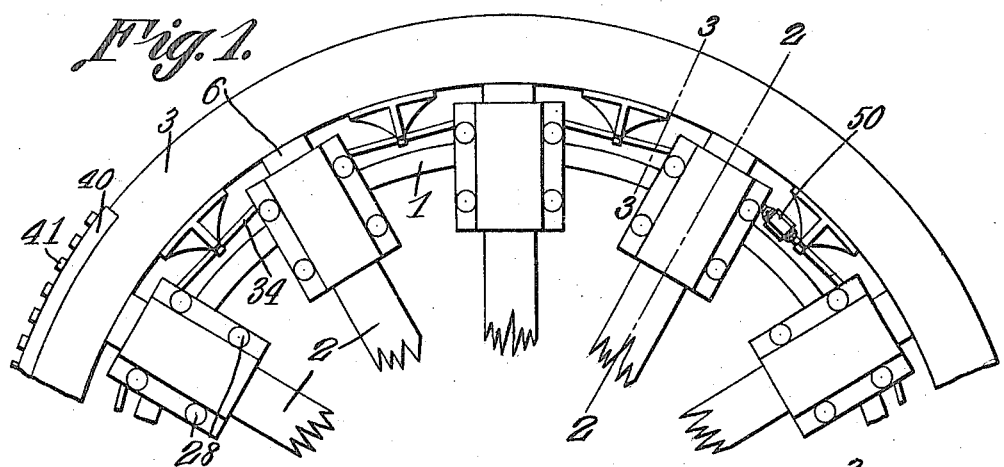
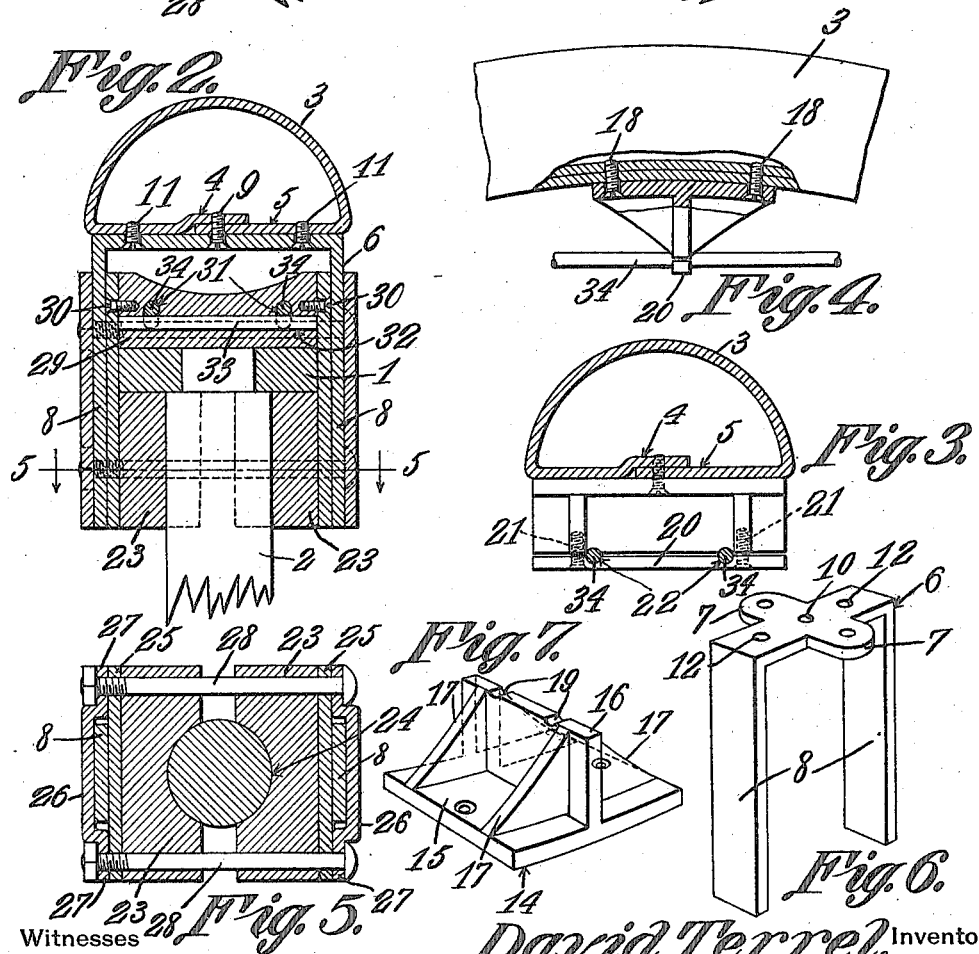
David Terrel, Inventor
by C. A. Snow & Co.
Attorneys

UNITED STATES PATENT OFFICE.

DAVID TERREL, OF DEGRAFF, OHIO.

TIRE.

1,187,677.      Specification of Letters Patent.      Patented June 20, 1916.

Application filed August 6, 1915. Serial No. 44,053.

*To all whom it may concern:*

Be it known that I, DAVID TERREL, a citizen of the United States, residing at Degraff, in the county of Logan and State of Ohio, have invented a new and useful Tire, of which the following is a specification.

The device forming the subject matter of this application is a tire and one object of the invention is to provide novel means whereby pneumatic elements subject to puncture and damage may be dispensed with.

Another object of the invention is to provide novel means whereby the tire is supported yieldingly.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows in side elevation, a tire embodying the invention; Fig. 2 is a cross section on the line 2—2 of Fig. 1; Fig. 3 is a cross section on the line 3—3 of Fig. 1; Fig. 4 is a fragmental side elevation wherein parts are broken away; Fig. 5 is a section on the line 5—5 of Fig. 2; Fig. 6 is a perspective of the anti-creeping member; Fig. 7 is a perspective of the bracket.

In the accompanying drawings, the numeral 1 indicates a felly supported on spokes 2.

The numeral 3 designates a tire of any desired contour, the tire preferably being resilient. The tire 3 ordinarily is fashioned from spring steel and is of approximately semi-circular cross section, the tire comprising inner flanges which are overlapped upon each other as shown at 4 to form a flat base 5. The invention comprises a plurality of anti-creeping members 6 of arched shape, and comprising arms 8. The anti-creeping members 6 embody circumferentially extended ears 7. Some of the securing elements 9 which unite the overlapped portions 4 of the tire 3 may be received in openings 10 in the anti-creeping members 6 to hold the latter on the tire. Other securing elements 11 may be mounted in openings 12 formed in the anti-creeping members, the securing elements 11 serving also to hold the anti-creeping members assembled with the tire.

Secured to the tire 3 in alternating relation with respect to the anti-creeping members 6 are brackets 14, each comprising a base 15, a cross piece 16, and circumferentially extended braces 17 uniting the cross piece 16 with the base 15. Securing elements 18 engage the base 15 of the bracket 14 and unite the same with the tire 3. In the edges of the cross piece 16, notches 19 are formed, the same being adapted to coöperate with notches 22 formed in a clamp strip 20, held to the edge of the cross piece 16 by means of securing elements 21.

Applied to opposite sides of the spokes 2 are clamp blocks 23, recessed as shown at 24 to receive the spokes. Applied to the outer faces of the clamp blocks 23 are side strips 25, upon which are superposed sockets 26 having outstanding flanges 27. Securing elements 28 unite the opposite clamp blocks 23 and pass through the side strips 25 and the flanges 27 of the sockets 26. The securing elements 28 lock both clamp blocks 23 on the spokes 2 and also hold the side strips 25 and the sockets 26 on the blocks. The inwardly extended arms 8 of the anti-creeping members 6 are received in the sockets 26. The arms 8 are so mounted in the sockets that the purpose of the invention may be carried out, whether the tire 3 be yieldable or rigid.

Located between the side strips 25 at one end thereof are supports 29 held to the side strips by means of securing elements 30. The supports 29 are equipped with circumferential openings 31, and with transverse openings 32 which intersect the openings 31. Journaled for rotation in the openings 32 and held against endwise movement by the side strips 25 are rollers 33.

Flexible elements which may be resilient cables 34 lie in the notches 19 and 22 of the cross piece 16 and the clamp strip 20, respectively, the cables being bound against the cross piece by the clamp strip. The cables 34 pass through the openings 31 in the supports 29, and are adapted to ride upon the rollers 33.

The cables 34 are spaced from the felly 1 and from the tire 3, and thus the tire will be supported or cradled upon the cables. Owing to this construction, a sufficient degree of resiliency is afforded.

If desired, the anti-creeping members 6 may be dispensed with, and this construction may be desirable when the device forming the subject matter of this application is used on the front wheels of an automobile.

The tire 3 may embody a resilient tread strip 40 equipped with anti-skidding projections 41, the part 40 being introduced into the structure merely in order to prevent unnecessary noise. Turn buckles 50 or other tightening devices may be interposed in the resilient cables 34.

Having thus described the invention, what is claimed is:—

1. In a device of the class described, a felly; a spoke projecting therefrom; clamp members engaging opposed sides of the spoke; sockets coacting with opposed faces of the clamp members; securing elements engaging the clamp members and the sockets and constituting a means for holding the sockets on the clamp members and a means for holding the clamp members on the spoke; an arched anti-creeping member embodying arms loosely received in the sockets; a tire secured to the anti-creeping member; a circumferential flexible element interposed between the tire and the felly; and spaced projections on the tire and the felly and engaged with the circumferential element.

2. In a device of the class described, a felly; side strips coacting with opposed edges of the felly; sockets assembled with the side strips; an arched anti-creeping element embodying arms loosely received in the sockets; a tire secured to the anti-creeping element; a resilient, circumferential member located between the tire and the felly; a projection on the tire and engaging the circumferential member; and a support superposed on the felly and located between the ends of the side strips, the flexible member passing through the support.

3. In a device of the class described, a felly; side strips extended along opposed edges of the felly; sockets assembled with the side strips; an arched anti-creeping element embodying arms loosely received in the sockets; a tire carried by the anti-creeping element; a circumferential flexible member disposed between the felly and the tire; a projection on the tire and coacting with the flexible member; a support superposed on the felly and located between the ends of the side strips; and a roller journaled for rotation in the support and held against endwise movement by the ends of the side strips, the flexible member passing through the support in contact with the roller.

In testimony that I claim the foregoing as my own, I have hereto affixed my signature in the presence of two witnesses.

DAVID TERREL.

Witnesses:
JOHN S. HUSTON,
O. C. HOUGH.

Copies of this patent may be obtained for five cents each, by addressing the "Commissioner of Patents, Washington, D. C."